(12) United States Patent
Neter

(10) Patent No.: US 6,663,813 B2
(45) Date of Patent: Dec. 16, 2003

(54) METHOD FOR COOLING MOLDED ARTICLES

(75) Inventor: Witold Neter, Newnan, GA (US)

(73) Assignee: Husky Injection Molding Systems Ltd. (CA)

( * ) Notice: Subject to any disclaimer, the term of this patent is extended or adjusted under 35 U.S.C. 154(b) by 21 days.

(21) Appl. No.: 09/931,439

(22) Filed: Aug. 16, 2001

(65) Prior Publication Data

US 2003/0205841 A1 Nov. 6, 2003

Related U.S. Application Data

(62) Division of application No. 09/311,961, filed on May 14, 1999, now Pat. No. 6,299,431
(60) Provisional application No. 60/094,445, filed on Jul. 28, 1998.

(51) Int. Cl.[7] .............................................. B29C 71/00
(52) U.S. Cl. .................... 264/237; 164/113; 164/312; 164/313; 164/314
(58) Field of Search ......................... 264/237; 164/113, 164/312, 313, 314

(56) References Cited

U.S. PATENT DOCUMENTS

| 4,422,995 | A | * | 12/1983 | Schad .......................... 264/250 |
| 4,449,913 | A |   | 5/1984  | Krishnakumar et al. |
| 4,592,719 | A | * | 6/1986  | Bellehache et al. ......... 425/526 |
| 4,786,455 | A |   | 11/1988 | Krishnakumar et al. |
| 4,836,767 | A |   | 6/1989  | Schad et al. |
| 4,941,815 | A |   | 7/1990  | Julian |
| 5,052,626 | A |   | 10/1991 | Wood et al. |
| 5,067,891 | A |   | 11/1991 | Julian et al. |
| 5,085,822 | A |   | 2/1992  | Uehara et al. |
| 5,176,871 | A |   | 1/1993  | Fukai |
| 5,232,641 | A |   | 8/1993  | Williamson et al. |
| 5,232,715 | A | * | 8/1993  | Fukai .......................... 425/526 |
| 5,443,360 | A | * | 8/1995  | Lamb et al. ................. 414/799 |
| 5,498,150 | A |   | 3/1996  | Check |
| 5,569,476 | A | * | 10/1996 | van Manen et al. ......... 425/556 |
| 5,817,345 | A |   | 10/1998 | Koch et al. |
| 5,830,404 | A |   | 11/1998 | Schad et al. |
| 6,143,225 | A |   | 11/2000 | Domodossola et al. |
| 6,171,541 | B1 | * | 1/2001 | Neter et al. ............ 264/328.14 |

FOREIGN PATENT DOCUMENTS

JP        08-103948     *   4/1996   ........... B29C/49/64

* cited by examiner

Primary Examiner—Michael Colaianni
Assistant Examiner—Monica A Fontaine
(74) Attorney, Agent, or Firm—Bachman & LaPointe, P.C.

(57) ABSTRACT

The present invention is related to a rotary cooling station to be used in conjunction with a high output injection molding machine and a robot having a take-out plate. More particularly, the present invention teaches a high speed robot that transfers warm preforms onto a separate rotary cooling station where they are retained and internally cooled by specialized cores. The preforms may also be simultaneously cooled from the outside to speed up the cooling rate and thus avoid the formation of crystallinity zones. Solutions for the retention and ejection of the cooled preforms are described. The rotary cooling station of the present invention may be used to cool molded articles made of a single material or multiple materials.

18 Claims, 6 Drawing Sheets

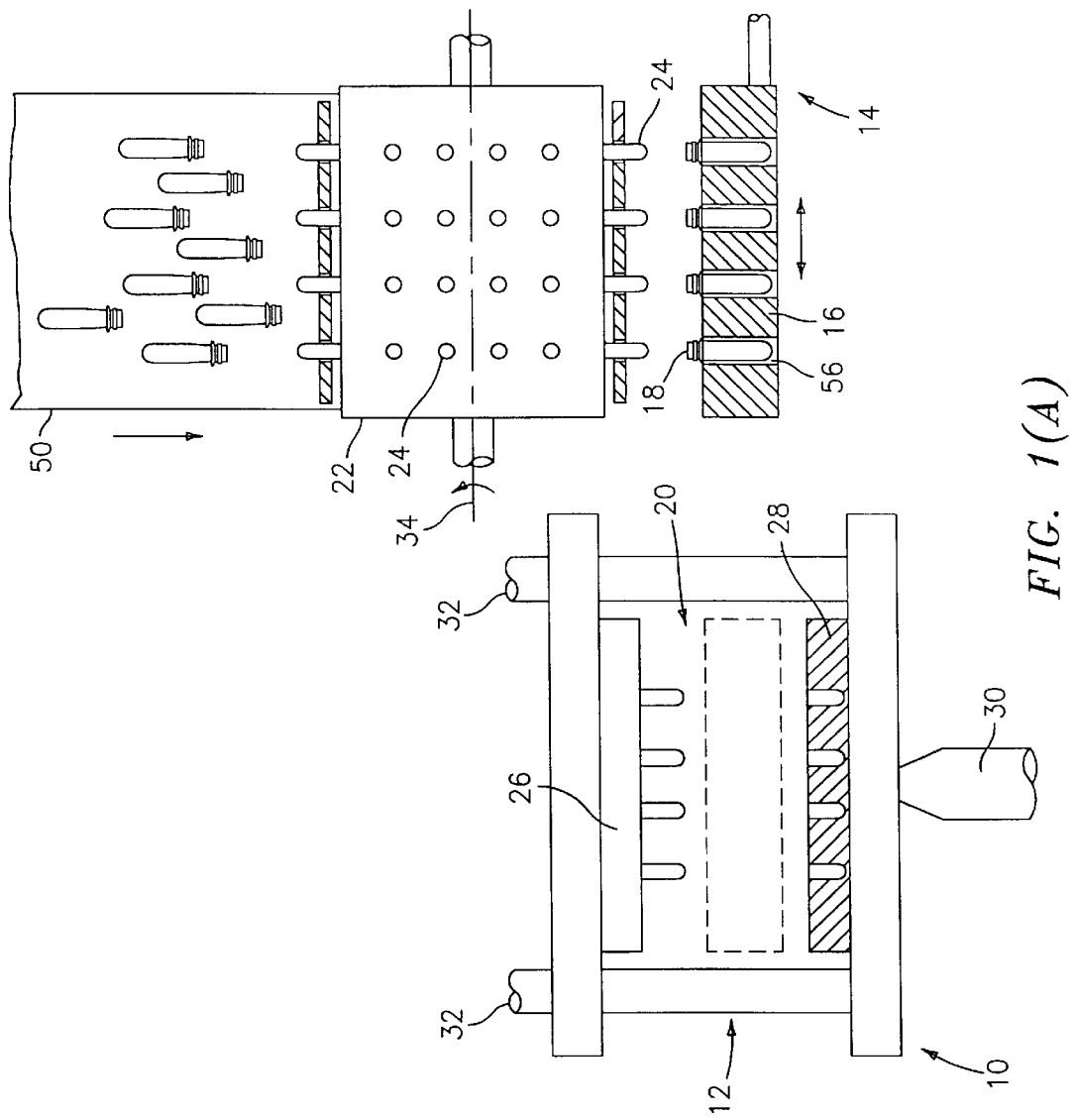

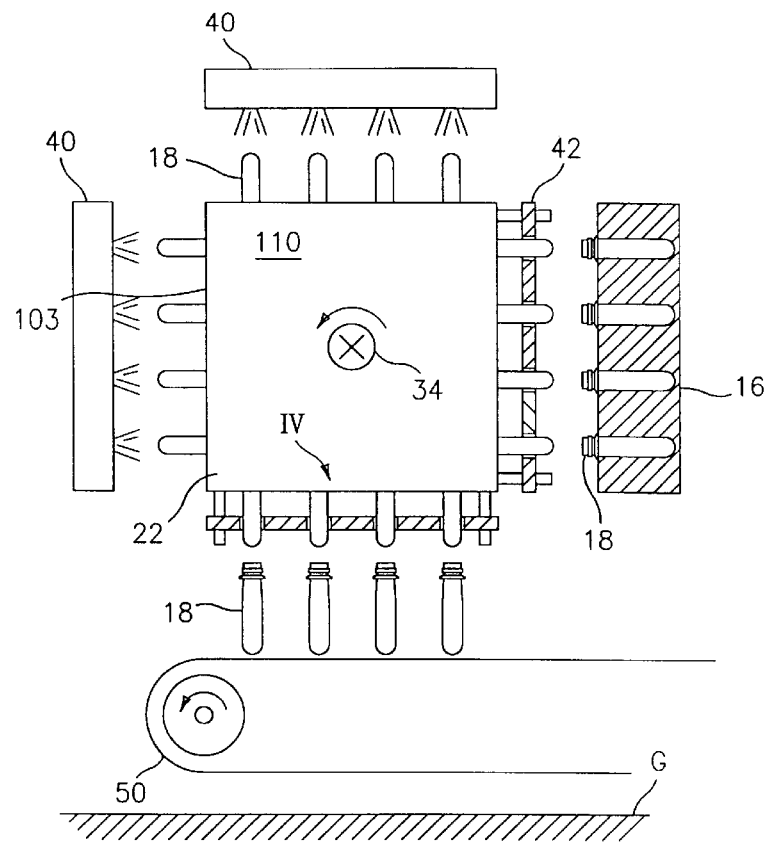
FIG. 2(A)
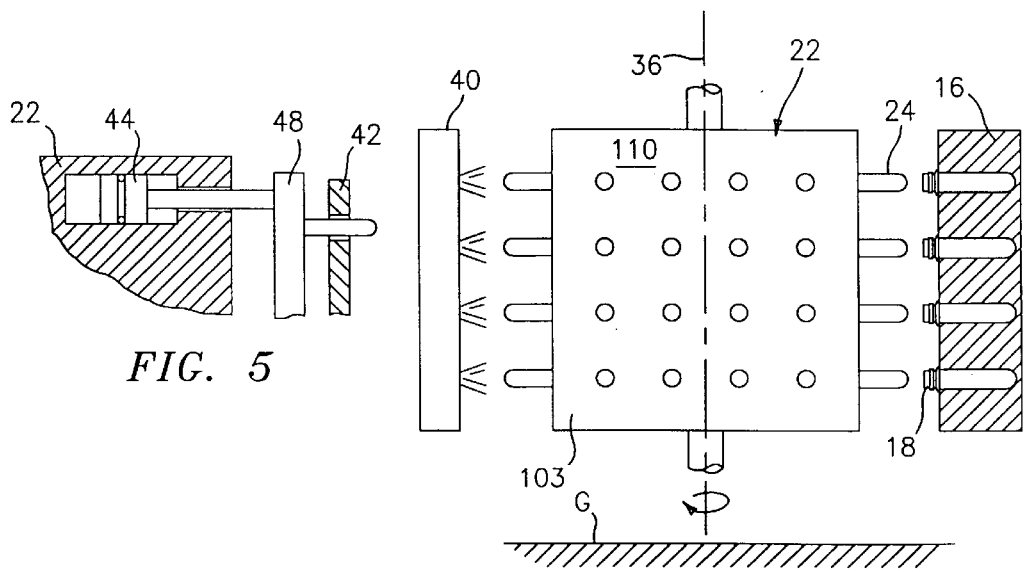
FIG. 5
FIG. 2(B)

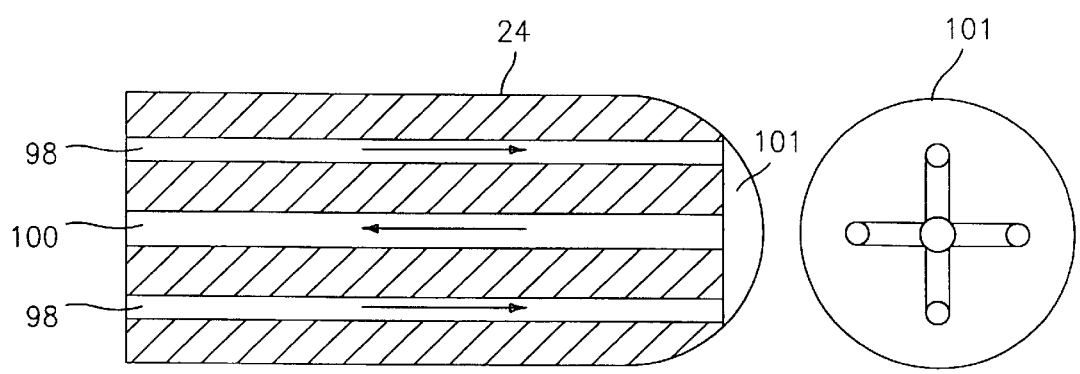
*FIG. 3(F)*  *FIG. 3(G)*

METHOD FOR COOLING MOLDED ARTICLES

CROSS REFERENCE TO RELATED APPLICATION(S)

This application is a divisional application of U.S. Patent Application Ser. No. 09/311,961, filed May 14, 1999 now U.S. Pat. No. 6,299,431, entitled COOLING APPARATUS FOR INJECTION MOLDING MACHINES to Witold Neter, which is related to and claims the benefit of provisional U.S. patent application Ser. No. 60/094,445, filed Jul. 28, 1998, entitled COOLING APPARATUS FOR INJECTION MOLDING MACHINES to Witold Neter.

BACKGROUND OF THE INVENTION

The present invention relates to a molding system for producing articles, such as preforms and tubular parts, and to an innovative rotary cooling station employed in said system. The present invention further relates to a method for producing molded articles.

Reduction of the injection molding cycle time is a major task when forming articles in a huge volume. This is for example the case of PET preforms that are formed using high cavitation molds, such as for example the 72 or 96 cavity molds made by Husky Injection Molding Systems, the assignee of the instant application.

One option to reduce the molding. cycle time is to limit the residence time of the preforms in the mold closed position by shortening the cooling step by a few seconds and thus ejecting the preforms from the mold sooner. One immediate benefit of a shorter residence time is that the content of acetylaldehyde (AA) in the final preform will drop by at least 5%. Because the preforms are still warm and fragile when they are transferred out of the mold to a robot having a take-out plate, they are vulnerable to deformation and surface damage. The internal heat retained by the preforms generates unacceptable crystallinity zones, especially at the sprue gate and neck finish portion of the preforms, if sufficient cooling is not provided immediately after opening the mold. Accordingly, optimizing and fine tuning the post mold cooling process and developing the necessary hardware is difficult when molding time is pushed beyond the normal cycle times.

Numerous attempts have been made in the past to improve the post-mold cooling process when forming PET preforms. These methods and equipment are not particularly applicable to a very fast molding cycle and do not properly cool the preforms ejected from the mold. Because early ejected preforms have warmer wails and retain a warmer air pocket inside the preform's inner cavity than the preforms made under normal conditions, they have to be cooled as soon and as fast as possible to prevent formation of crystallinity spots, or surface damage and deformation. Reference is made in this regard to U.S. Pat. No. 4,449,913 which shows an injection molding machine with a four face rotary mold plate, each face carrying a mold core plate. After molding, the preforms are removed from the cavities and retained on the injection cores for further internal cooling and for external cooling done by air blowers. The post-molding cooling step is performed while a new batch of preforms are formed on the same machine. This cooling approach is quite effective but the equipment is very expensive and complicated because three additional mold plates and three additional sets of injection cores are needed. This increases by three times the weight of the rotary mold plate block relative to a single face mold. In addition, these four mold plates and injection cores have to be manufactured with higher tolerances than those needed to make a single mold plate. This is due to the alignment requirements of the four sets of rotary cores with respect to a single stationary set of mold cavities. Also the relatively low speed of rotating, aligning and translating the heavy rotary mold core plate is a factor that significantly increases the molding cycle.

U.S. Pat. No. 4,836,767 to Schad et al. relates to an injection molding machine with a rotary mold core plate having two sets of mold cores. This is a dedicated non-standard molding machine that has only three tiebars, one being used as a rotation axis for the mold core plate. After molding one batch of articles, such as PET preforms, they are retained on the mold cores and the mold core plate is rotated by one tiebar. In this way, the preforms are removed from the molding area and then are ejected into a rotary cooling station. This four face cooling station includes tubes that retain and cool the preforms from the outside. After being externally cooled, the preforms are ejected and dropped with the neck finish downward on a conveyor. If the preforms are not sufficiently cooled the neck finish can be damaged. This combination of a rotary mold machine and a rotary cooling station is much-slower than having a dedicated robot to remove the preforms from the mold. This patent does not teach or anticipate internal cooling by the rotary cooling station or simultaneous external and internal cooling. Internal cooling in addition to the external cooling they teach would require a specialized equipment and highly accurate alignment.

U.S. Pat. No. 5,569,476 to Manen and Albers relates to a standard injection molding and a four face rotary cooling station. Each face of this rotary cooling station is movable and thus functions as a take-out robot because it can be moved laterally between the mold plates to remove the preforms and bring them to the cooling station. This design has several drawbacks: (a) the preforms are cooled solely externally on the retaining tubes belonging to the rotary cooling station; (b) the system is expensive and complicated as it must use four rather than just one robot arm that travel for a relatively long distance. This patent does not teach or suggest internal cooling, does not teach or suggest simultaneous internal and external cooling, and does not teach or suggest a single robot that feeds a rotary cooling station.

SUMMARY OF THE INVENTION

Accordingly, it is an object of the present invention to overcome the deficiencies of the aforementioned injection molding systems.

It is a further object of the present invention to provide a system which represents a simpler molding operation and cooling solution.

It is yet another object of the present invention to provide a system that provides a more efficient cooling and a faster cycle time.

The system of the present invention uses a standard injection molding machine with only one set of mold cores and a novel and innovative rotary cooling station that is independent from the injection molding machine, which cooling station is loaded with molded preforms by a high speed robot. The rotary cooling station uses cooling cores for internal cooling and cooperates with external cooling stations to effect cooling of the external surfaces of the molded articles or preforms. The cooling cores, in a preferred embodiment, are designed to create an annular flow of cooling fluid within the molded articles, such as preforms or tubular parts, being cooled.

The method for forming molded articles in accordance with the present invention broadly comprises the steps of providing a machine for manufacturing a plurality of molded articles and a rotary cooling device positioned externally of the machine, the rotary cooling device having a plurality of faces with cooling cores on them; forming a first batch of the molded articles in the machine; removing the first batch of molded articles from the machine and transferring the molded articles to a position. external of the machine; placing the molded articles of the first batch on a plurality of cooling cores on a first face of the rotary cooling device; and rotating the device to move the first batch of molded articles to a first cooling position. The method further comprises forming a second batch of molded articles in the machine; removing the second batch of molded articles from the machine and transferring the molded articles to the external position; placing the second batch of molded articles on the cooling cores on a second face of said rotating device; and simultaneously cooling the first and second batches of molded articles.

Other details of the system, the apparatus, and the method of the present invention, as well as other objects and advantages attendant thereto, are set forth in the following description and the accompanying drawings wherein like reference numerals depict like elements.

BRIEF DESCRIPTION OF THE DRAWINGS

FIG. 1(A) is a top view of a first embodiment of an injection molding system according to the current invention;

FIG. 2(A) is a lateral view of the rotary cooling station used in the embodiment of FIG. 1(A);

FIG. 2(B) is a lateral view of the rotary cooling station used in the embodiment of FIG. 1(B);

FIGS. 3(A)–3(G) illustrate different embodiments of cooling cores employed on the rotary cooling stations of the present invention;

FIG. 5 illustrates a system employed in the rotary cooling stations of the present invention for moving a cooling core relative to a take-out plate.

DETAILED DESCRIPTION OF THE PREFERRED EMBODIMENT(S)

Figure 1B:
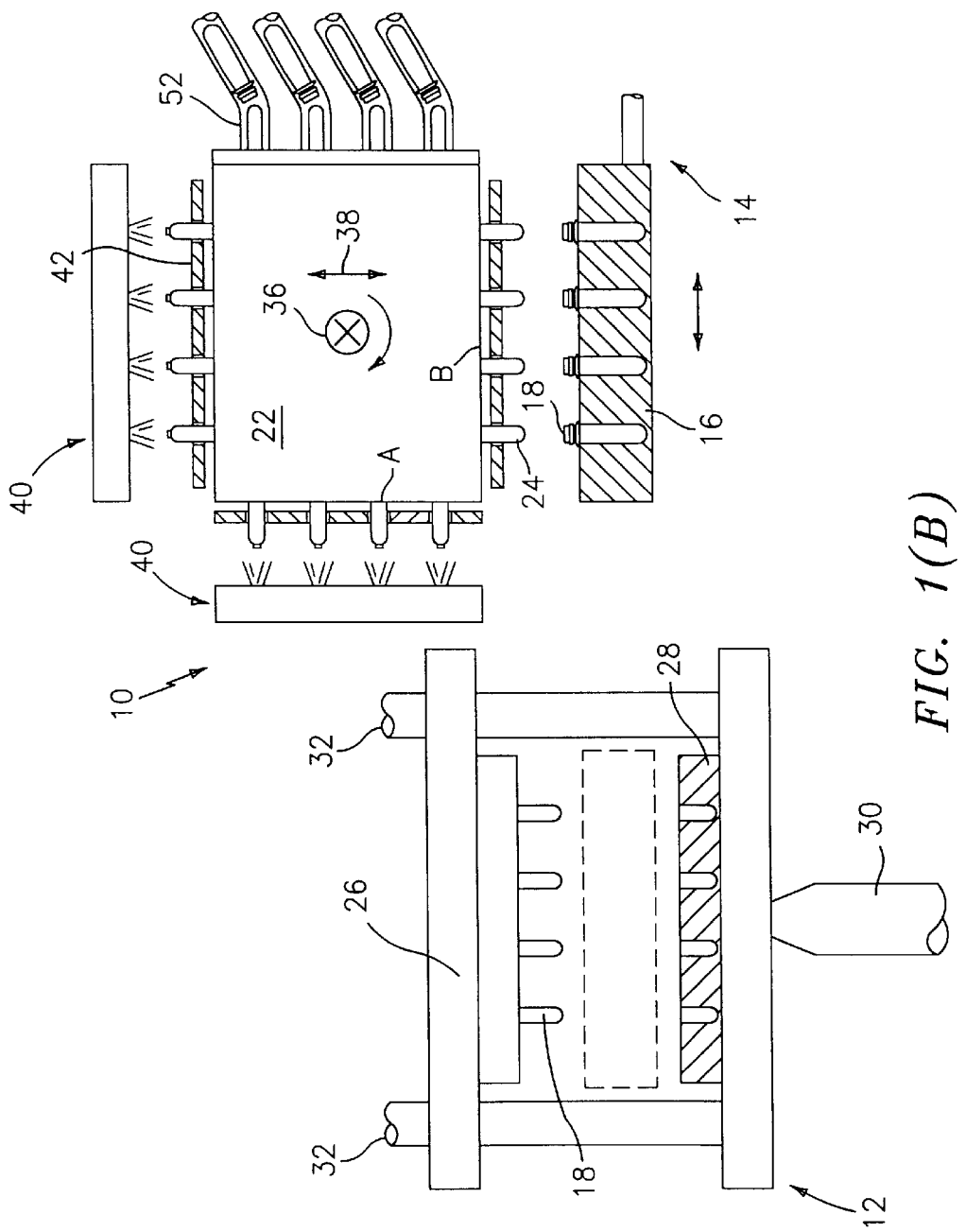
FIG. 1(B) is a top view of a second embodiment of an injection molding system according to the current invention.

Referring now to the drawings, FIGS. 1(A), 1(B), 2(A) and 2(B) illustrate embodiments of an injection molding system 10 in accordance with the present invention. The system 10 includes an injection molding machine 12 and a robot 14 which includes a take-out plate 16, which take-out plate 16 transfers molded articles 18, such as for example blowable preforms, from the mold 20 to an innovative rotary cooling station 22, positioned externally of the injection molding machine 12, which station is used to internally cool the preforms on a plurality of innovative cooling cores or pins 24.

The molding machine 12 may be any suitable molding machine known in the art and preferably includes two mold plates, namely a mold core plate 26 and a mold cavity plate 28. The mold core plate 26 is axially movable along tiebars 32 between a mold open position and a mold closed position. The two mold plate halves 26 and 28 define, in the mold closed position, a plurality of mold cavity spaces (not shown). An injection unit 30 is provided to inject a moldable material under pressure into the mold cavity spaces in a known manner.

When the mold halves 26 and 28 are in the mold open position, the robot 14 including the take-out plate 16 is moved between the mold halves 26 and 28 to receive the molded articles 18 in a known manner and then transfer the molded articles 18 to a position outside of the molding area.

In FIGS. 1(A) and 2(A), the rotary cooling station 22 rotates about an axis 34 which is substantially parallel to the ground G. FIGS. 1(B) and 2(B) are substantially identical except for the rotary cooling station 22 being rotatable about an axis 36 which is substantially perpendicular to the ground G and being translatable in the direction 38. As shown in FIG. 1(B), additional cooling stations 40 can be provided for external cooling of the molded articles 18. The external cooling technique employed by the stations 40 can be either conductive cooling or convective cooling. One, two or more external cooling stations 40 can be used, in conjunction with a rotary cooling station 22 that has three, four, or more faces, to cool molded articles 18 on cores 24.

As can be seen from FIGS. 1(A) and 1(B), the rotary cooling. station or device 22 is independent of the injection molding machine 12 and is placed outside the molding area to receive and cool the molded articles 18 provided by the robot 14 and the take-out plate 16. After the molded articles 18 are internally cooled using the novel cooling cores 24 of the present invention, they are ejected from the cooling cores 24 using any conventional means known in the art, such as stripper plate 42, stripper pins (not shown) inside the cooling cores, or an air blow system (not shown).

Referring now to FIG. 2(A), as previously discussed, in this embodiment, the rotary cooling station 22 rotates about an axis 34 which is substantially parallel to the ground G. This means that when the molded articles 18 reach the bottommost portion of the rotation cycle, position IV in FIG. 2(A), the face of the station 22 carrying the cooled molded articles 18 is also substantially parallel to the ground. This allows the molded articles 18 to be dropped onto a conveyor 50 through the movement of a retaining and stripping plate 42.

Referring now to FIGS. 1(B) and 2(B), the axis of rotation 36 of the cooling station 22 is substantially perpendicular to the ground G. This configuration of the cooling station 22 is not suitable for the free drop of the cooled molded articles 18 onto a conveyor. Accordingly, the molded article 18 ejected from the cooling cores 24 in this embodiment preferably are removed using any array of air absorption powered conveying tubes 52 as shown in FIG. 1(B).

As shown in more detail in FIGS. 3(A)–3(G), internal cooling of the molded articles 18 on the rotary cooling station 22 is done using novel cooling cores 24 that actually enter inside the molded article 18. This new post-mold cooling approach has significant advantages over the external cooling on a rotary station using cooling tubes shown in U.S. Pat. Nos. 4,836,767 and 5,569,476. This is because the system of the present invention allows the use of an independent high speed robot 14 including a take-out plate 16 having retaining tubes 56 to hold the molded articles 18. Using cooling cores 24 on a rotary station 22, in the form of a rotary turret, to internally cool the molded articles 18 allows the molded articles 18 to be simultaneously cooled from the outside using simple equipment without any need for precise alignment with the cooling cores 24. Simultaneous cooling is very important as it prevents the formation of crystallinity zones inside the preforms, particularly in the dome or sprue gate portion 57. The known prior art does not teach the use of internal and external cooling means in conjunction with a rotary cooling station that is independent of and external to the injection molding machine used to form the molded articles being cooled. Using an additional cooling device for internal cooling of preforms retained in cooling tubes would be more slower and difficult to make and align.

By using innovative cooling cores in accordance with the present invention, additional air absorption sucking conduits can be fabricated or machined inside the cooling cores. This effective approach avoids the need to use any other mechanical retaining means for the preforms or molded articles.

Using cooling cores 24 on the rotary cooling station 22 helps to orient the preforms or molded articles 18 with the neck finish portion in an upward position, if a gravity based ejection method is selected. If cooling tubes were used, the preforms would drop with the neck finish portion first hitting the conveying means. This could damage or deform the neck finish portion.

Using cooling cores, the ejection of the preforms or molded articles 18 from the rotary cooling station 22 can be made very convenient and fast using air absorption conveying tubes. The same air absorption ejection tubes would be very difficult to use if cooling tubes were used.

Figure 3A:
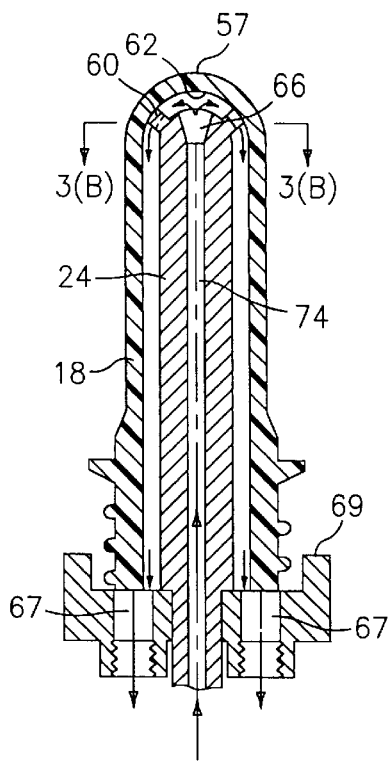
Figure 3B:
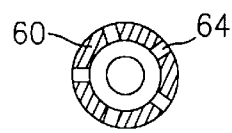
Figure 3C:
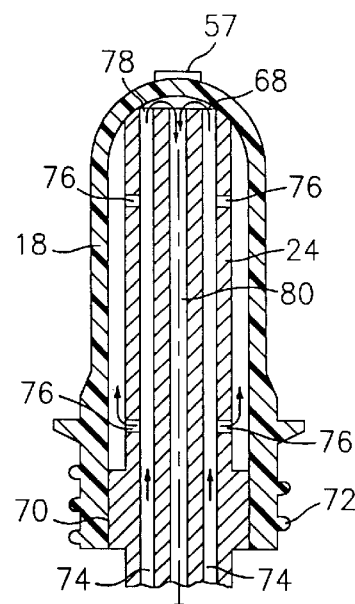

FIGS. 3(A)–3(C) illustrate two embodiments of a cooling core 24 in accordance with the present invention which can be used on the rotary cooling station 22. Both of these embodiments provide cooling by air blowing and retention by air absorption. In both embodiments, the balance between the cold air cooling fluid introduced into the interior of the molded article 18 and the amount of air absorption rate is such as to hold the molded article or preform 18 firmly through a dragging effect.

In the cooling core embodiment of FIGS. 3(A) and 3(B), the core 24 has a central channel 74 which is connected to a source (not shown) of cooling fluid such as cooled air. The channel 74 ends in a nozzle 66. A perforated ring 60 is attached to or integrally formed with the top of the core 24. The ring 60 is designed to make contact with the interior surface 62 of the molded article 18 and better hold the molded article 18 aligned with the core 24. As shown in FIG. 3(B), the ring 60 includes a plurality of apertures or ports 64 for allowing air flowing out of the nozzle 66 to flow downwardly along the sides of the molded article to effect cooling of same and then. out through channels 67 in support 69, which channels 67 may be in communication with a vacuum source (not shown) if desired so as to create the desired air absorption rate. Preferably, the cooling core 24 is positioned within the molded article 18 so that the air flowing out of the nozzle 66 creates a substantially annular flow pattern in the dome portion 57 of the molded article 18.

Referring now to the cooling core embodiment of FIG. 3(C), a stronger grip may be provided by tapering the top 68 of the cooling core 24 and by providing an aligning shoulder 70 that makes contact with the preform or molded article 18 in the neck finish portion 72. As shown in FIG. 3(C), air flows into the molded article via the channel 74, which is connected to a source (not shown) of cooled air, and through openings 76 and 78 into contact with the interior surfaces of the molded article 18. The cooling air is preferably removed via channel 80 which is connected to a suction device (not shown) for creating the desired air absorption rate.

Figure 3D:
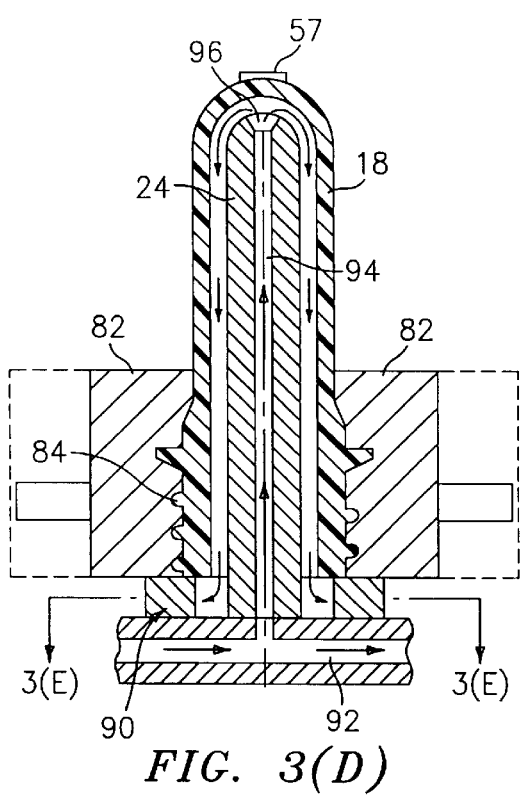
Figure 3E:
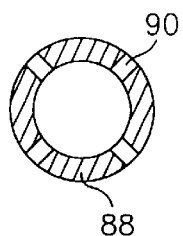

Another cooling core embodiment is illustrated in FIGS. 3(D) and 3(E). As shown therein, the molded article or preform 18 is retained on the cooling core 24 by mechanical means that hold it from outside on the neck portion. In one embodiment, the mechanical means comprise two semi-circular gripping collars 82 having a threaded inner portion 84, which collars are used to clamp the molded articles 18. The collars 82 are laterally movable so as to allow the molded articles 18 to be retained or released automatically. The collars-82 also may have a forward-backward movement along the axis of the molded article to allow movement of the collars 82 through any retaining and stripping plate. The correlation between the lateral and axial movements of the collars 82 can be done using any suitable mechanical means (not shown) known in the art such as cams (not shown). The collars 82 may be sustained or supported by at least one holding ring 88 having radial perforations 90 which allow the blown cooling air to escape after cooling the preform or molded article 18. As shown in FIG. 3(D), cooling air enters the molded article 18 via a manifold 92 and a channel 94 in the cooling core 24. The cooling air exits the outlet nozzle 96, which is spaced a distance from the interior surface of the molded article 18 that enables the creation of an annular air flow pattern. The cooling air flows along the side walls of the article 18 and out via perforations 90.

If desired, the cooling core 24 may be formed from a porous material. Alternatively, the cooling core 24, as shown in FIGS. 3(F) and 3(G), may be formed from an aluminum material having a plurality of cooling channels 98 for causing a cooling fluid to flow into a tip portion 101 of the cooling core 24 and an outlet channel 100 machined therein, which outlet channel 100 also communicates with the tip portion 101. As shown in FIG. 3(G), the outlets of the channels 98 may be arranged in a cross-like pattern. The outlet channel 100 is preferably centrally arranged to remove the cooling air from the tip portion 101 and thus the interior of the molded article 18.

Figure 4A:
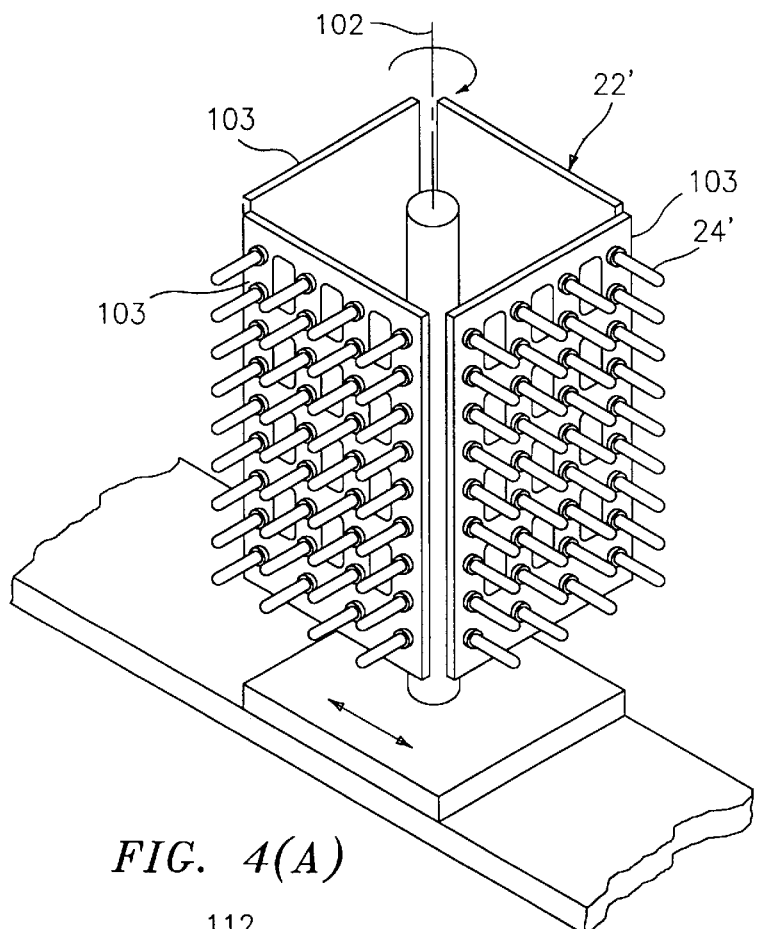
FIGS. 4(A) and 4(B) shows an alternative embodiment of a rotary cooling station in accordance with the present invention.
Figure 4B:
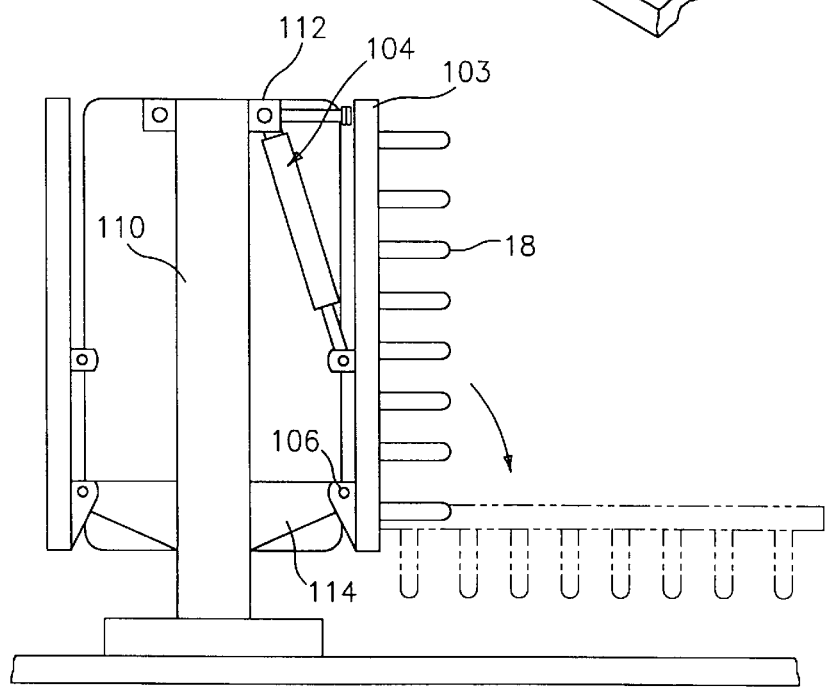

FIGS. 4(A) and 4(B) illustrates a cooling station 22' having a rotation axis 102 substantially perpendicular to the ground G. The cooling station 22' has a plurality of faces 103, each with a plurality of cooling cores 24'. The faces 103 may be individually pivoted, as shown in FIG. 4(B), to allow the preform or molded articles 18 carried by the cooling cores 24' to be dropped onto a conveyor (not shown) after being cooled. Any suitable mechanical arrangement known in the art, such as the one shown in FIG. 4(B), may be used to pivot each face 103 about point 106 and through any desired angle such as approximately 90 degrees. For example, the central rotatable member 110 may have a pivoting arm actuation system 104 connected to a rear wall of each face 103 and to a bracket 112 connected to an upper end of the member 110. The central rotatable member 110 may further have a plurality of brackets 114 connected to it at a lower end which are each hingedly connected at point 106 to a respective one of the faces 103.

As previously discussed, the robot 14 and the take-out plate 16, shown in FIGS. 1(A) and 1(B), are movable between the mold halves 26 and 28 after they have been moved to the mold open position shown in FIG. 1(A) and after the molded articles 18 have been somewhat cooled while the mold halves 26 and 28 are in the mold closed position. Any known robot, such as a top or lateral entry robot, can be used for the robot 14. The take-out plate 16 preferably has a plurality of retainers 56, such as tubes, to hold each molded article or preform ejected from the mold. In a preferred embodiment, no cooling means is incorporated into the take-out plate 16. This allows the plate 16 to be light and rapidly movable. In another embodiment, the take-out plate 16 may include means (not shown) for externally cooling the molded articles or preforms immediately after ejection from the mold. The preforms or molded articles 18 can be cooled while in the plate 16 externally by conduction using a tight enclosure (not shown) that makes contact with the molded article's or preform's exterior wall. This enclosure may be cooled with cold water or other suitable fluids. In other instances, especially if the weight of the take-out plate 16 has to be minimal, cooling may be done on the take-out plate by convection using any suitable gas known in the art as a coolant, such as for example ambient or refrigerated air.

The robot take-out plate 16 may further include means to eject the molded articles or preforms 18 for further handling. Reference is made in this regard to U.S. Pat. No. 5,447,426, which is incorporated by reference herein, and which shows mechanical means to remove preforms from a take-out plate. While it is possible to add movements to the robot 14 and the take-out plate 16, this would increase the weight of the robot making it a little slower. For example, a new translation perpendicular to the first one can be used to move the robot 14 or the take-out plate 16 towards the rotary cooling station 22. In some cases, a rotation may also be added to accommodate the relative position between the take-out plate 16 and the rotary cooling station 22.

Referring now to FIGS. 2(A) and 2(B), the innovative cooling station 22 includes a rotary block 110 having multiple faces 103, for example four faces. The number of faces 103 actually depends on the number and duration of the temperature conditioning steps. Each face 103 comprises an array of novel cooling cores 24 used to hold the molded articles or preforms 18 during the cooling steps. Each face 103 of the rotary cooling station 22 also includes movable stripper plates 42 that allow the ejection of the molded articles or preforms 18 from the cooling cores 24. If desired, other stripping methods and/or means can be employed to remove the preforms from the cooling cores 24, such as stripping pins located inside each cooling core or by air blowing.

The rotary movement of the block 110 can be achieved using any suitable means known in the art such as electrical servomotors (not shown).

If desired, the rotary cooling stations 22 shown in the embodiments of FIGS. 1(A), 1(B), 2(A) and 2(B) also can be translated, for example along an axis parallel to the injection machine, towards and away from the take-out plate 16, to permit the transfer of the preforms or molded articles 18. Any suitable means known in the art may be employed to effect translation of the rotary cooling station.

In an alternative embodiment of the present invention, instead of translating the entire rotary cooling station 22, each face of the rotary cooling station may have a movable core plate 48 which is independently moved parallel to the station's face. This may be done for only a short distance towards and away from the take-out plate 16 to allow the transfer of the molded articles or preforms 18 from the take-out plate 16 onto the cores 24. FIG. 5 illustrates such a movable core plate. As shown therein, the core plate 48 and the array of cooling cores 24 attached thereto are translated by using an air piston 44 placed at each corner of the station's face. In such an arrangement, the rest of the cooling station 22 remains stationary. The individual translation of the cooling cores 24 with each face of the rotary conditioning station 22 is done using very simple and known mechanisms. By using individual movements of each face, the transferring process is much faster and compact.

Any appropriate coolant known in the art, such as air, liquid nitrogen or water, can be used and aggressively directed by the cooling cores 24 towards the inner walls of the molded articles or preforms 18 to effect cooling. In a preferred embodiment of the present invention, cold air is used as a coolant, which cold air can be directed through the specific design of the cooling core towards any portion of the preform. Preferentially, the cold air will be directed towards the dome or sprue gate portion 57 of a molded article or preform 18, which portion usually has the highest potential to crystallize due to poor post mold cooling. In other instances, the cold air may also be directed to the neck finish portion 70 of the molded article or preform, especially when this portion has a thick wall.

According to the present invention, the space between the cooling cores 24 and the interior of the molded articles and preforms 18 is optimized to effect an annular flow pattern of the cooling fluid, which optimized flow is a function of the size and thickness of the preform's walls. The cooling cores 24 may be made of a material having superior thermal conductivity such as aluminum, aluminum alloys and the like.

As shown in FIGS. 3(A)–3(G), the cooling cores of the present invention may have several inner conduits. According to one aspect of this invention, at least one of these conduits can be used to firmly hold the molded article or preform 18 by air absorption. Other conduits or channels may be used to circulate the fluid coolant, such as a liquid or a gas (low pressure air) between the inner walls of the preform and the core. According to the present invention, air can be used also for ejecting the preforms from the cores at the end of the cooling step. The outer surface of the cooling cores may have various shapes or roughness values that may contribute to achieving a more efficient flow of the coolant between this surface and the preform's inner surface.

According to another embodiment of the present invention, the rotary block 22 may include cooling cores 24 that do not provide any fluid coolant towards the inner walls of the preform or molded articles. These "passive" cooling cores are made of a high thermally conductive material and are maintained relatively colder than the preforms due to the huge mass of the cooling station. This means that the molded articles retained on top of these "passive" cooling cores are cooled through conduction heat transfer at a lower rate, while they are rotated by the cooling station. The cooling rate can be significantly increased by using external cooling, such as by blowing air, that is provided by an appropriate secondary cooling station. This cooling option based on "passive" cores can be used for small articles or for articles that have thin walls.

According to another embodiment of the present invention, the molded articles or preforms 18 are retained on the rotary cooling station 22 by mechanical retaining means.

According to still another embodiment (not shown), it is possible to use a stripping and retaining plate that works in a manner similar to a PET preform mold stripper plate. This plate has two threaded collar halves that surround and engage the neck finish portion of each preform. This plate is thus able to separate and bring together the two halves during their movement back and forth against cam means. This would allow the threaded portions of the collars to engage the neck finish portion. According to this aspect of the invention, the stripper plate has an additional innovative function which is to retain the preforms. In the known mold applications, the threaded portion of the collar is used as a part of the cavity, besides the ejection function. Each face of the rotary cooling station has one retaining and stripping plate that are moved using known means.

As shown in FIG. 1(B), additional external cooling stations 40 can be provided while the molded articles or preforms 18 are held on the rotary cooling station 22. This is an option that can be used for higher cooling rate of any preform or if the internal cooling is not sufficient, for example, for preforms having thicker walls. This additional external cooling is preferably delivered by a device which blows ambient or refrigerated air onto the preforms that are simultaneously being cooled internally by the cooling cores 24. Depending on the preform design or the preform temperature, several cooling stations 40 can be used for the external cooling steps. This can be done using a rotary cooling station with four or more faces.

According to the present invention, the following cooling methods of a molded article can be applied using the novel rotary cooling station 22 with or without the external cooling device 40: (a) internal cooling without any external cooling; (b) internal and external cooling; and (c) "passive" cooling internally (without using a coolant) and external cooling. The simultaneous internal-external cooling is preferred to achieve the fastest possible injection molding cycle. Simultaneous internal-external cooling should be used when the wall of the preforms is thick. For thin wall articles, active internal cooling only should be sufficient. Simultaneous cooling may also be done when cooling preforms made of several materials. This means that the molded article is made by injecting several materials inside one mold cavity or in several mold cavities. This simultaneous cooling technology using the innovative rotary cooling station is also applicable to multi-material molded articles including an insert. In this case, at least one of the materials is injected into a different mold cavity than the others.

According to the present invention, preferential cooling of the sprue gate portion of the preform and/or the neck finish portion of the preform can be done by selecting the design of the cores and by choosing the optimum configuration of the external cooling device. According to the present invention, the temperature of the coolant can be varied continuously during the cooling process. The preforms can be thus cooled more or less aggressively depending on their size, wall thickness or their actual temperature before the cooling step is initiated. According to the present invention, the new cooling station and the cooling methods described herein can be applied equally to single or multi-material preforms.

The system shown in FIG. 1(B) may be used to cool molded articles or preforms 18 made of a single or multiple materials according to the following steps: (a) molten material(s) is/are injected in the mold cavity spaces; (b) the molded articles or preforms 18 are somewhat cooled and at least partly solidified while the mold is in the mold closed position; (c) the mold is opened; (d) a high speed robot 14 having a take-out plate 16 is moved between the mold plates; (e) preforms 18 are transferred from the injection cores into the take-out plate 16; (f) the take-out plate 16 holding preforms 18 is moved outside the mold area to a position adjacent the innovative rotary cooling station 22; (g) preforms 18 are transferred from the take-out plate 16 to cooling cores 24 on a first face A of the rotary cooling station 22; (h) robot 14 is moved back towards the entrance of the molding area waiting to move again between the mold halves; and (i) the cooling station 22 is rotated, usually by 90 degrees, to bring the molded preforms 18 on the cores 24 on the first face A in front of an air cooling station 40 so that the preforms 18 are simultaneously. internally and externally cooled and so that the next face B of the rotary cooling station 22 replaces face A and is ready to receive the next batch of preforms. The process then repeats itself from step (a) with the exception that the next batch of preforms is transferred to the cooling cores 24 on face B for cooling. One of the advantages to this approach is that multiple batches of molded articles 18 can be simultaneously cooled.

According to an alternative embodiment of the current invention, the same process takes place without using the additional air cooling station to externally cool the preforms. This is shown in FIG. 1(A) and is applicable for molded articles such as preforms having thinner walls.

According to another aspect of the present invention, the take-out plate 16 may be able to hold a single or several batches of molded articles or preforms 18.

According to another aspect of the present invention, the take-out plate 16 may include means for cooling external surfaces of the preforms 18 using a fluid such as water or a gas such as blown cold air.

According to another embodiment of the present invention, it is also possible to retain the molded preforms on the cooling cores without using a coolant delivered by these cores. Cooling may be effected using a "passive" approach, more exactly through the intimate contact between the cooling cores and the molded articles while the articles are retained on the rotary cooling station. This cooling approach is likely not as efficient as the one where the cooling cores include channels to guide a fluid coolant.

It is apparent that there has been provided in accordance with this invention a cooling apparatus for injection molding machines which fully satisfies the means, objects, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for cooling molded articles comprising the steps of:

providing a machine for manufacturing a plurality of molded articles and a rotary cooling device positioned externally of said machine, said rotary cooling device having a plurality of faces with cooling cores on them;

forming a first batch of said molded articles in said machine;

removing said first batch of molded articles from said machine and transferring said molded articles to a position external of said machine;

placing said molded articles of said first batch onto a plurality of cooling cores on a first face of said rotary cooling device after said transferring step; and rotating said device to move said first batch of molded articles to a first cooling position.

2. The method according to claim 1, further comprising:

forming a second batch of molded articles in said machine;

removing said second batch of molded articles from said machine and transferring said molded articles to said external position; and placing said second batch of molded articles on said cooling cores on a second face of said rotating device;

rotating said rotary cooling device to move said first batch of molded articles to a second cooling position and said second batch of molded articles to said first cooling position; and simultaneously cooling' said first and second batches of molded articles.

3. The method according to claim 2, further comprising cooling external surfaces of each said batch of molded articles when' said batch is in at least one of said first and second cooling positions.

4. The method according to claim 3, wherein said external surface cooling step comprises blowing a cooling fluid against said external surfaces.

5. The method according to claim 2, further comprising blowing a cooling fluid through said cooling cores onto interior surfaces of said molded articles in said first and second batches.

6. The method according to claim 5, wherein said blowing step creates an annular flow of cooling air which flows over interior surfaces of said molded articles.

7. The method according to claim 2, further comprising holding said molded articles onto said cooling cores.

8. The method according to claim 7, wherein said holding step comprises providing a passageway connected to a suction source and holding said molded articles onto said cooling cores by applying an air absorption force to interior surfaces of said molded articles.

9. The method according to claim 7, wherein said holding step comprises gripping an external neck portion of each said molded article.

10. The method according to claim 2, further comprising ejecting said molded articles from said cooling cores upon completion of a cooling cycle.

11. The method according to claim 10, wherein said ejecting step comprises transferring said cooled molded articles to a means for conveying said molded articles to a desired location.

12. A method for cooling molded articles comprising the steps of:
providing a machine for manufacturing a plurality of molded articles and a rotary cooling device positioned externally of said machine, said rotary cooling device having a plurality of faces with cooling cores on them;
forming a first batch of said molded articles in said machine;
removing said first batch of molded articles from said machine and transferring said molded articles to a position external of said machine;
placing said molded articles of said first batch onto a plurality of cooling cores on a first face of said rotary cooling device;
rotating said device to move said first batch of molded articles to a first cooling position;
forming a second batch of molded articles in said machine;
removing said second batch of molded articles from said machine and transferring said molded articles to said external position;
placing said second batch of molded articles on said cooling cores on a second face of said rotating device;
rotating said rotary cooling device to move said first batch of molded articles to a second cooling position and said second batch of molded articles to said first cooling position;
simultaneously cooling said first and second batches of molded articles;
ejecting said molded articles from said cooling cores upon completion of a cooling cycle;
said ejecting step comprising transferring said cooled molded articles to a means for conveying said molded articles to a desired location;
said rotary cooling device having a central member; and
further comprising rotating said cooling device to an ejection position and prior to said ejecting step pivoting each said face when it reaches said ejection position to a position substantially perpendicular to said central member.

13. A method for cooling molded articles comprising the steps of:
providing a machine for manufacturing a plurality of molded articles;
providing a rotary cooling device having a central member which rotates about a first axis and a plurality of faces attached to said central member, with each of said faces having a set of cores for applying cooling directly to interior surfaces of said molded articles;
positioning said cooling device externally of said molding machine;
placing respective one of said molded articles on at least one set of cores on at least one face of said cooling device by relative movement between said at least one set of cores and a robot containing said molded articles;
providing at least one external cooling station at an angle relative to said robot and an ejection station; and
rotating said central member about said first axis so as to cause said molded articles on said at least one set of cores on said at least one face to be exposed to external cooling at said at least one external cooling station;
continuing rotation of said central member about said first axis so that said molded articles reach said ejection station; and
ejecting said molded articles from said at least one set of cores on said at least one face.

14. A method according to 13 claim wherein said ejecting step comprises ejected said molded articles from said at least one set of cores by at least one movable stripper plate.

15. A method according to claim 13, wherein said placing step comprises translating said at least one set of cores relative to said central member and said robot so that each of said cores enters a respective one off said molded articles.

16. A method according to claim 13, wherein said at least one external cooling station providing means comprises providing at least two external cooling stations positioned at an angle relative-to each other and said rotating step comprises rotating said central member so that said molded articles move past each of said external cooling stations.

17. A method according claim 13, wherein said ejecting step comprises removing said molded articles using an air conveyor.

18. A method for cooling molded articles comprising:
providing a machine for making molded articles;
providing a robot for removing molded articles from said machine;
providing a cooling device external of said molding machine for receiving molded articles from said robot;
said cooling device providing step comprising providing a central member rotatable about a vertical axis and a plurality of faces movable relative to said central member, with each of said faces having a set of cooling cores;
loading said molded articles onto said set of cooling cores on at least one face at a first position;
applying external cooling to said molded articles by rotating said central member about said vertical axis so that said molded articles on said set of cooling cores passes at least one cooling station; and ejecting said molded articles from said set of cooling cores by rotating said at least one face about an axis substantially perpendicular to said vertical axis.

* * * * *